S. T. FREAS.
SWAGE SHAPER FOR SAW TEETH.
APPLICATION FILED OCT. 3, 1913.
1,115,300.
Patented Oct. 27, 1914.
2 SHEETS—SHEET 2.
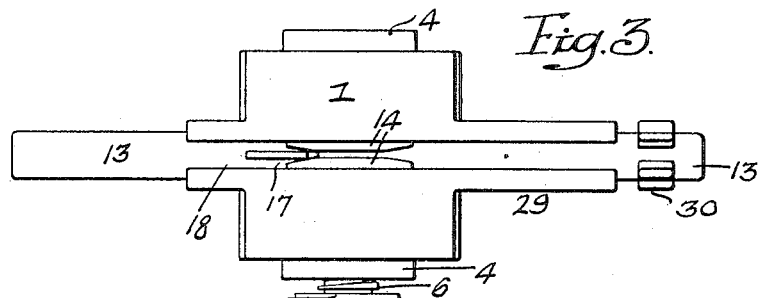
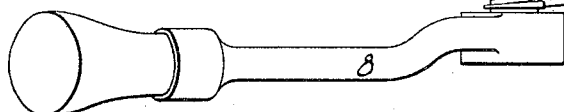
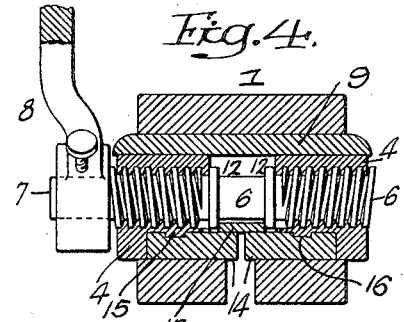
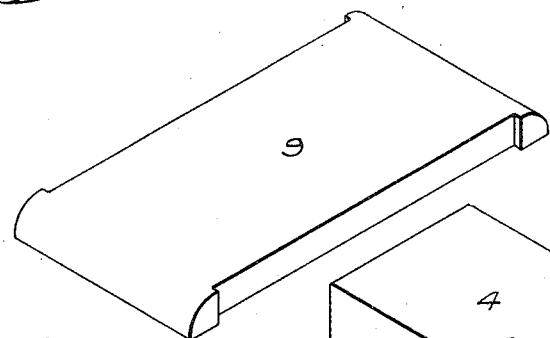
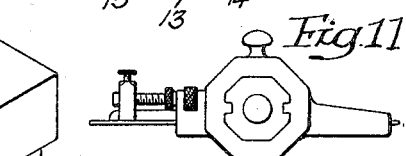
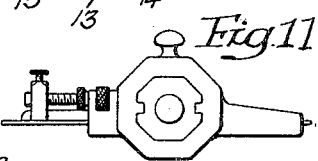
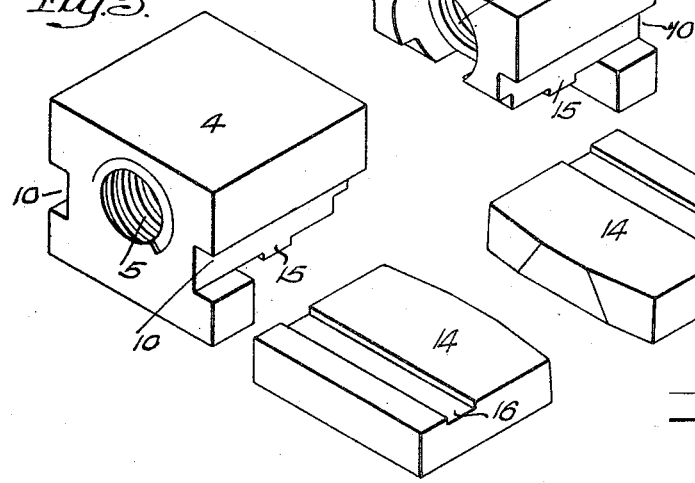
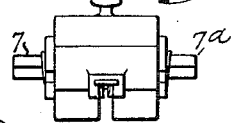
Inventor:—
Samuel T. Freas.
by his Attorneys.—

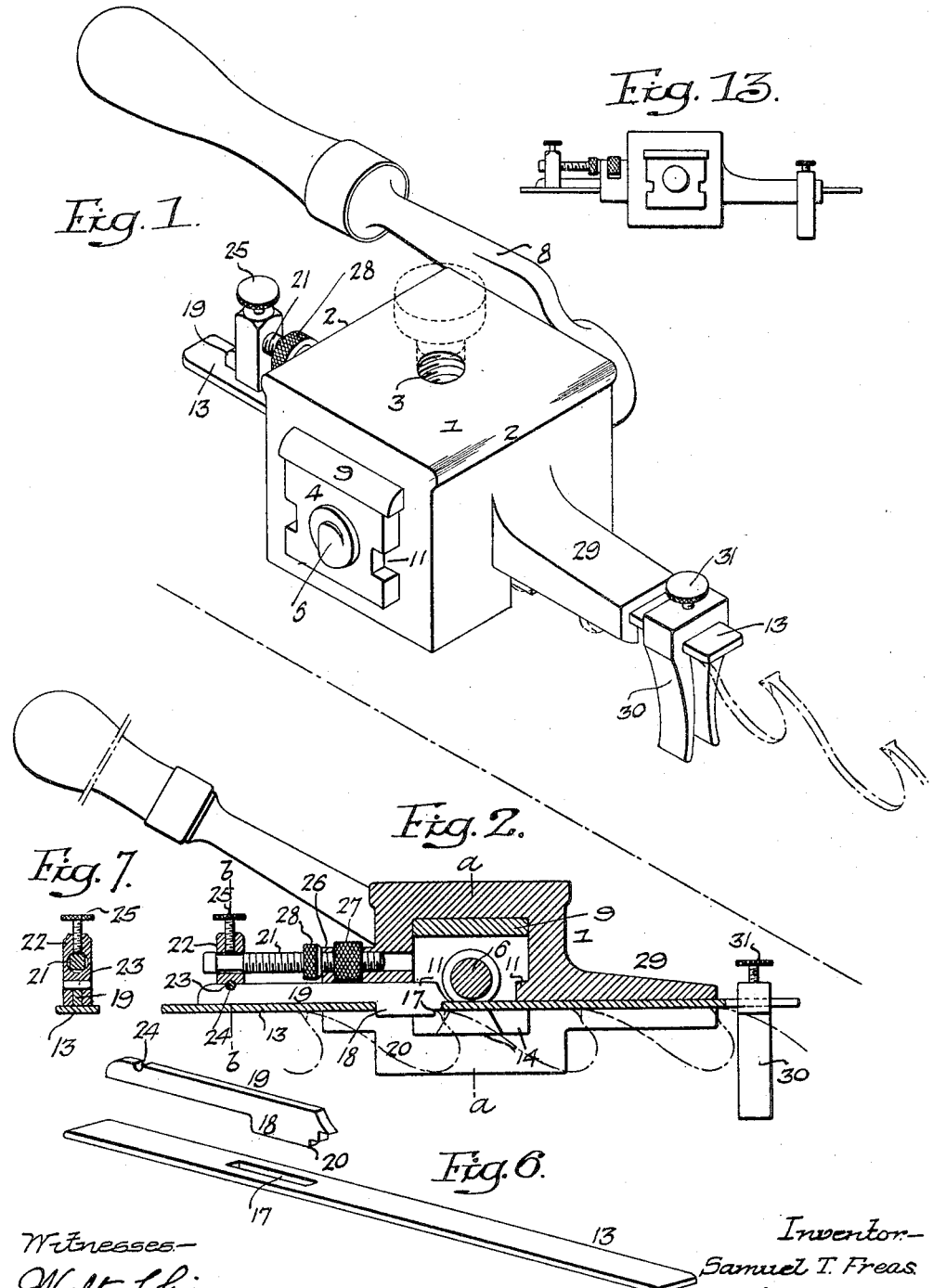

UNITED STATES PATENT OFFICE.

SAMUEL T. FREAS, OF TRENTON, NEW JERSEY, ASSIGNOR TO HENRY DISSTON & SONS, INCORPORATED, OF PHILADELPHIA, PENNSYLVANIA, A CORPORATION OF PENNSYLVANIA.

SWAGE-SHAPER FOR SAW-TEETH.

1,115,300.  Specification of Letters Patent.  Patented Oct. 27, 1914.

Application filed October 3, 1913.   Serial No. 793,182.

*To all whom it may concern:*

Be it known that I, SAMUEL T. FREAS, a citizen of the United States, residing in Trenton, Mercer county, New Jersey, have invented certain Improvements in Swage-Shapers for Saw-Teeth, of which the following is a specification.

One object of my invention is to construct a swage shaper for saw teeth so that it can be readily applied to the swaged teeth of a saw and operated so as to side dress or size the teeth of the saw, in order that they may be of uniform width, and shaping the teeth so that they will be undercut at the rear of the point for the necessary clearance.

A further object of the invention is to construct the swage shaper so that it can be readily adjusted to accommodate saws of any thickness or space of teeth.

A still further object of the invention is to make the anvils detachable so that they can be readily dressed or renewed.

These objects I attain in the following manner, reference being had to the accompanying drawings, in which—

Figure 1, is a perspective view of my improved swage shaper; Fig. 2, is a longitudinal sectional view; Fig. 3, is an inverted plan view; Fig. 4, is a transverse sectional view on the line *a—a*, Fig. 2; Fig. 5, is a detached perspective view of the anvil carrying blocks and the anvils detached therefrom, together with the plate on which the blocks slide; Fig. 6, is a detached perspective view showing the gage bar and detachable stop; Fig. 7, is a sectional view on the line *b—b*, Fig. 2; Fig. 8, is a perspective view of a swaged saw tooth; Fig. 9, is a perspective view of a swaged saw tooth shaped by my improved device; Fig. 10, is a diagrammatical view showing a saw tooth between the two dies; and Figs. 11, 12 and 13 are views of modifications.

A swage shaper is designed for the purpose of reducing the width of the point of a saw tooth after it has been swaged, so that all of the teeth of a saw will be of uniform thickness. The tooth is cut in the ordinary manner, then the ends of the tooth are swaged by a suitable tool so as to increase the width of the tooth at the end in order that the cutting edge of the tooth will be of a greater width than the body of he tooth.

Referring to the drawings, 1 is the body portion of the swage shaper, rectangular in shape in the present instance, and having ribs 2 at the upper edge forming hand grasps, but the body portion may be perfectly plain, if desired, and a hand hold, as illustrated in dotted lines, may be used by screwing it into the opening 3 in the body portion.

Arranged to slide in the body portion, toward and from each other, are blocks 4 having longitudinal openings 5 and these openings are threaded to receive the threads of a coarse pitch screw 6, which has right and left hand threads, as illustrated in Fig. 4. One of the blocks has a right hand thread and the other has a left hand thread so that, when the screw is turned in one direction, the blocks will be moved toward each other and, when the screw is turned in the opposite direction, the blocks will be forced apart.

On the end of the screw 6 is a stem 7 to which a handle 8 is attached by which the screw is turned. This stem 7 may be on one side only, as in Fig. 4, or it may be on both sides, as shown at 7ª in Fig. 12, so that the tool can be used either by a right hand or a left hand operator. Where a single stem is used the tool will have to be dismantled and the screw shifted so that the handle will be on the opposite side to that illustrated in Fig. 4 for a left hand operator.

The two blocks slide in a plate 9 which is shouldered, as illustrated in Fig. 5, and fits in the cavity in the body portion 1. Each block is grooved at 10 to receive the ribs 11 of the body portion 1. These ribs, in the present instance, from an integral part of the body portion, as illustrated in Fig. 1.

The screw 6 has a central plain portion, as illustrated in Fig. 4, on each side of which is a flange 12.

13 is a gage plate extending throughout the length of the device and adapted to a slot in the body portion. This gage plate extends into the space between the two flanges 12 and holds the screw in a central position.

The anvils 14 are identical in form and each anvil is carried by a block 4. A transverse tongue 15 on each block enters a groove 16 in its anvil and the blocks extend back of the anvils so as to relieve the tongues from strain. The working face of each anvil is shaped, as shown in Fig. 5, so as to slightly bevel the teeth from the point s, Fig. 9, toward the back as well as toward the gullet, in order to provide the necessary clearance and to insure a clean cut, but the shape of the working face of the anvil may be varied according to the type of tooth to be shaped.

In order to adjust the gage plate longitudinally in the body portion 1, I make it as illustrated in Fig. 6. The plate has a slot 17, which receives the projecting portion 18 of a stop 19 which extends as a rib from the upper surface of the plate 13. The end 20 of this stop rests against the point of the saw tooth and acts as a gage for the machine so as to properly aline the anvils opposite the point of a tooth to be shaped. In order to adjust this gage bar longitudinally, I attach a screw stem 21 to the bar through the medium of a head 22, which is forked and extends over the stop 19 having a projection 23 which enters a notch 24 in the stop, as illustrated in Fig. 2, and a set screw 25, which confines the head to the screw 21. The screw stem extends into an opening in a projection 26 on the body portion, as well as through the openings in the body portion and between the projection and the body portion is a nut 27 and on the opposite side of the projection is a jam nut 28, so that, on turning the nut 27, the gage bar is moved longitudinally and, after it is moved to the position desired, it can be firmly locked by the lock nut 28. At the opposite side of the body portion is an extension 29 having an undercut groove for the gage bar which projects beyond the end of this extension, and adjustably mounted on the gage bar is a centering jaw 30 having arms which extend on each side of the saw. This jaw may be adjusted longitudinally and held in the adjusted position by a set screw 31 so that the jaws will engage the body of the saw back of the point of the tooth.

By making the gage bar and jaw adjustable, as above described, the device can be applied to saws having teeth of different spacing.

It will be seen from the above description that I am enabled to locate the anvils close to the screw and by accurately fitting the blocks in the body portion, I prevent the binding or locking of the blocks on the screw when the anvils are brought toward each other under pressure; straining of the device being avoided.

In Fig. 11, I have illustrated a modification of the device; the opening in the body portion being octagonal and the blocks are octagonal in shape to fit this opening.

It will be understood that the shape of the blocks may be varied, as desired, and the contour of the body portion may also be varied.

I claim:

1. The combination of a body portion having a transverse opening therein; two blocks mounted in the opening and prevented from turning therein, said blocks having threaded openings; a screw having a right and a left hand thread, the two threaded portions being spaced apart, the screw extending through the openings in the blocks; a longitudinal guideway in the body portion; and a gage bar mounted in the longitudinal guideway and adapted to engage the saw teeth and extending into the space between the threaded portions of the screw, whereby the screw is retained in the central position.

2. The combination of a body portion having a transverse opening and a longitudinal guideway intersecting the transverse openings; two blocks slidably mounted in the transverse opening; an anvil carried by each block, each block having a threaded opening; a screw having a right and a left hand thread adapted to the openings in the blocks, the threads being spaced apart; flanges on the screw; and a gage bar mounted in the longitudinal guideway and extending between the flanges of the screw forming a gage for the saw and a lock for the screw.

3. The combination of a body portion having a transverse opening; a plate extending through the opening; two blocks also mounted in the opening and arranged to slide on the plate; an anvil carried by each block; a screw having a right hand and a left hand thread extending through the threaded openings in the blocks; and means for turning the screw to move the anvils toward and from each other.

4. The combination of a body portion having a transverse opening therein and a longitudinal guideway intersecting the opening; two guide blocks in the transverse opening; an anvil carried by each guide block; a screw having a right hand and a left hand thread extending through openings in the guide blocks; means for turning the screw; a slotted gage bar mounted in the guideway; a stop extending through the guide plate and forming a rib thereon; a screw, a head attached to the screw, stop and guide bar; and a nut confined to the body portion and arranged to turn on the screw so as to move the gage bar longitudinally.

5. The combination of a body portion having a transverse opening therein and having a longitudinal slot intersecting said transverse opening; two blocks mounted in the transverse opening; an anvil carried by each block; a screw for actuating the blocks; a gage bar mounted in the slot; and an adjustable jaw mounted on the gage bar.

In testimony whereof I have signed my name to this specification in the presence of two subscribing witnesses.

SAMUEL FREAS.

Witnesses:
E. B. ROBERTS,
W. C. BURKHOLDER.

Copies of this patent may be obtained for five cents each, by addressing the "Commissioner of Patents, Washington, D. C."